(12) United States Patent
Abedini et al.

(10) Patent No.: US 12,289,619 B2
(45) Date of Patent: Apr. 29, 2025

(54) DYNAMIC ADAPTATION OF BROADCAST TRANSMISSIONS FOR NETWORK ENERGY SAVINGS

(71) Applicant: QUALCOMM Incorporated, San Diego, CA (US)

(72) Inventors: Navid Abedini, Basking Ridge, NJ (US); Naeem Akl, Somerville, NJ (US); Jianghong Luo, Skillman, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 17/652,720

(22) Filed: Feb. 28, 2022

(65) Prior Publication Data

US 2023/0276260 A1    Aug. 31, 2023

(51) Int. Cl.
  *H04W 24/02* (2009.01)
  *H04W 52/02* (2009.01)
  *H04W 68/00* (2009.01)
  *H04W 72/23* (2023.01)

(52) U.S. Cl.
  CPC ....... *H04W 24/02* (2013.01); *H04W 52/0203* (2013.01); *H04W 68/005* (2013.01); *H04W 72/23* (2023.01)

(58) Field of Classification Search
  CPC . H04W 76/27; H04W 52/0212; H04W 76/28; H04W 56/0015; H04W 68/02; H04W 52/0293; H04W 52/0216; H04W 52/0235; H04W 72/23; H04L 5/0048; H04L 27/2613; H04L 25/0202; H04L 25/0226; H04L 27/2602; H04L 5/0023; H04L 5/0094; Y02D 30/70; H04B 7/0456; H04B 7/06
  See application file for complete search history.

(56) References Cited

U.S. PATENT DOCUMENTS

| | | | | |
|---|---|---|---|---|
| 9,472,206 B2* | 10/2016 | Ady | ................. | G10L 25/48 |
| 9,609,602 B2* | 3/2017 | Jain | ................. | H04L 67/10 |
| 11,197,338 B2* | 12/2021 | Hsieh | ................. | H04W 52/0229 |
| 11,792,881 B2* | 10/2023 | Öhmann | ................. | H04W 72/0453 370/311 |
| 11,799,691 B2* | 10/2023 | Kim | ................. | H04W 72/23 |
| 11,923,939 B2* | 3/2024 | Chen | ................. | H04B 7/0695 |
| 2012/0320791 A1 | 12/2012 | Guo et al. | | |
| 2015/0223284 A1* | 8/2015 | Jain | ................. | H04W 36/0088 370/329 |
| 2018/0324678 A1* | 11/2018 | Chen | ................. | H04W 8/08 |
| 2020/0389883 A1 | 12/2020 | Faxer et al. | | |

(Continued)

OTHER PUBLICATIONS

International Search Report and Written Opinion—PCT/US2023/062741—ISA/EPO—Jun. 7, 2023.

*Primary Examiner* — Jung Liu
(74) *Attorney, Agent, or Firm* — Paul M. McAdams; Harrity & Harrity, LLP

(57) ABSTRACT

Various aspects of the present disclosure generally relate to wireless communication. In some aspects, a network node may transmit a dynamic indication of an updated configuration for an always-on periodic communication associated with the network node. The network node may communicate the always-on periodic communication according to the updated configuration. Numerous other aspects are described.

30 Claims, 9 Drawing Sheets

(56) References Cited

U.S. PATENT DOCUMENTS

| | | | |
|---|---|---|---|
| 2021/0204357 A1* | 7/2021 | Tang | H04W 48/16 |
| 2021/0336819 A1* | 10/2021 | Kim | H04W 72/23 |
| 2021/0360680 A1 | 11/2021 | Nam et al. | |
| 2022/0279445 A1* | 9/2022 | Shrivastava | H04W 24/08 |
| 2023/0051117 A1* | 2/2023 | Tsai | H04L 5/0048 |
| 2023/0084343 A1* | 3/2023 | Berggren | H04W 76/27 |
| | | | 370/311 |
| 2023/0216564 A1* | 7/2023 | Chen | H04B 7/088 |
| | | | 375/262 |
| 2023/0232354 A1* | 7/2023 | Cui | H04W 76/28 |
| | | | 370/350 |
| 2023/0276387 A1* | 8/2023 | Laselva | H04W 68/02 |
| | | | 370/503 |
| 2024/0080152 A1* | 3/2024 | Shrivastava | H04W 52/0235 |

\* cited by examiner

DYNAMIC ADAPTATION OF BROADCAST TRANSMISSIONS FOR NETWORK ENERGY SAVINGS

FIELD OF THE DISCLOSURE

Aspects of the present disclosure generally relate to wireless communication and to techniques and apparatuses for dynamic adaptation of broadcast transmissions for network energy savings.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting a dynamic indication of an updated configuration for an always-on periodic communication associated with the network node. The method may include communicating the always-on periodic communication according to the updated configuration.

Some aspects described herein relate to a method of wireless communication performed by a user equipment (UE). The method may include receiving a dynamic indication of an updated configuration for an always-on periodic communication associated with a network node. The method may include communicating the always-on periodic communication according to the updated configuration.

Some aspects described herein relate to a network node for wireless communication. The network node may include a memory and one or more processors coupled to the memory. The one or more processors may be configured to transmit a dynamic indication of an updated configuration for an always-on periodic communication associated with the network node. The one or more processors may be configured to communicate the always-on periodic communication according to the updated configuration.

Some aspects described herein relate to a UE for wireless communication. The UE may include a memory and one or more processors coupled to the memory. The one or more processors may be configured to receive a dynamic indication of an updated configuration for an always-on periodic communication associated with a network node. The one or more processors may be configured to communicate the always-on periodic communication according to the updated configuration.

Some aspects described herein relate to a non-transitory computer-readable medium that stores a set of instructions for wireless communication by a network node. The set of instructions, when executed by one or more processors of the network node, may cause the network node to transmit a dynamic indication of an updated configuration for an always-on periodic communication associated with the network node. The set of instructions, when executed by one or more processors of the network node, may cause the network node to communicate the always-on periodic communication according to the updated configuration.

Some aspects described herein relate to a non-transitory computer-readable medium that stores a set of instructions for wireless communication by a UE. The set of instructions, when executed by one or more processors of the UE, may cause the UE to receive a dynamic indication of an updated configuration for an always-on periodic communication associated with a network node. The set of instructions, when executed by one or more processors of the UE, may cause the UE to communicate the always-on periodic communication according to the updated configuration.

Some aspects described herein relate to an apparatus for wireless communication. The apparatus may include means for transmitting a dynamic indication of an updated configuration for an always-on periodic communication associated with the apparatus. The apparatus may include means for communicating the always-on periodic communication according to the updated configuration.

Some aspects described herein relate to an apparatus for wireless communication. The apparatus may include means for receiving a dynamic indication of an updated configuration for an always-on periodic communication associated with a network node. The apparatus may include means for communicating the always-on periodic communication according to the updated configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
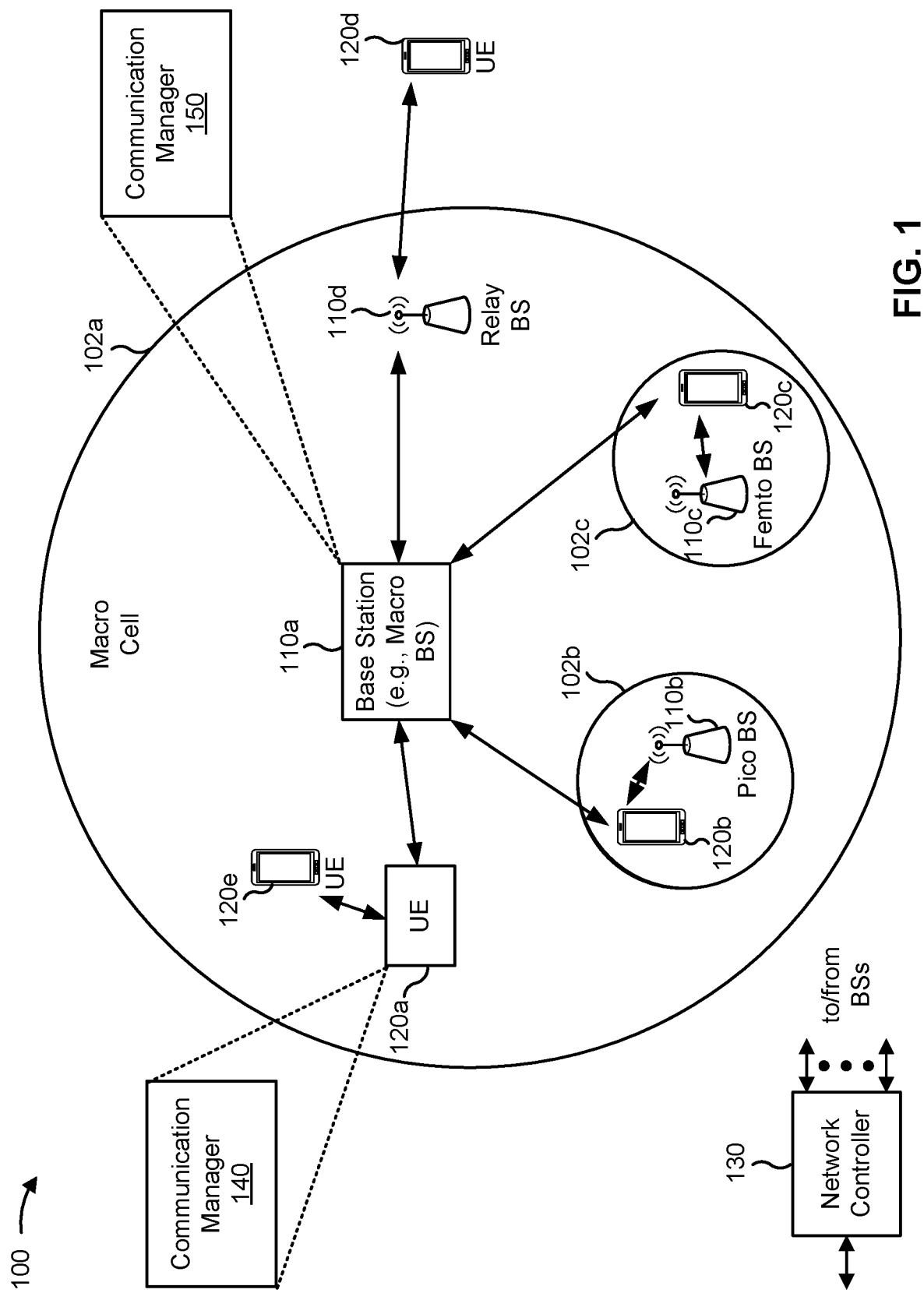
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more actions associated with dynamic adaptation of broadcast transmissions for network energy savings. Additionally, or alternatively, the communication manager 140 may perform one or more other operations described herein.

In some aspects, a network node (e.g., the base station 110) may include a communication manager 150. As described in more detail elsewhere herein, the communication manager 150 may perform one or more actions associated with dynamic adaptation of broadcast transmissions for network energy savings. Additionally, or alternatively, the communication manager 150 may perform one or more other operations described herein.

As described herein, a node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

As indicated above, FIG. 1 is provided as an example. Other examples may differ from what is described with regard to FIG. 1.

Figure 2:
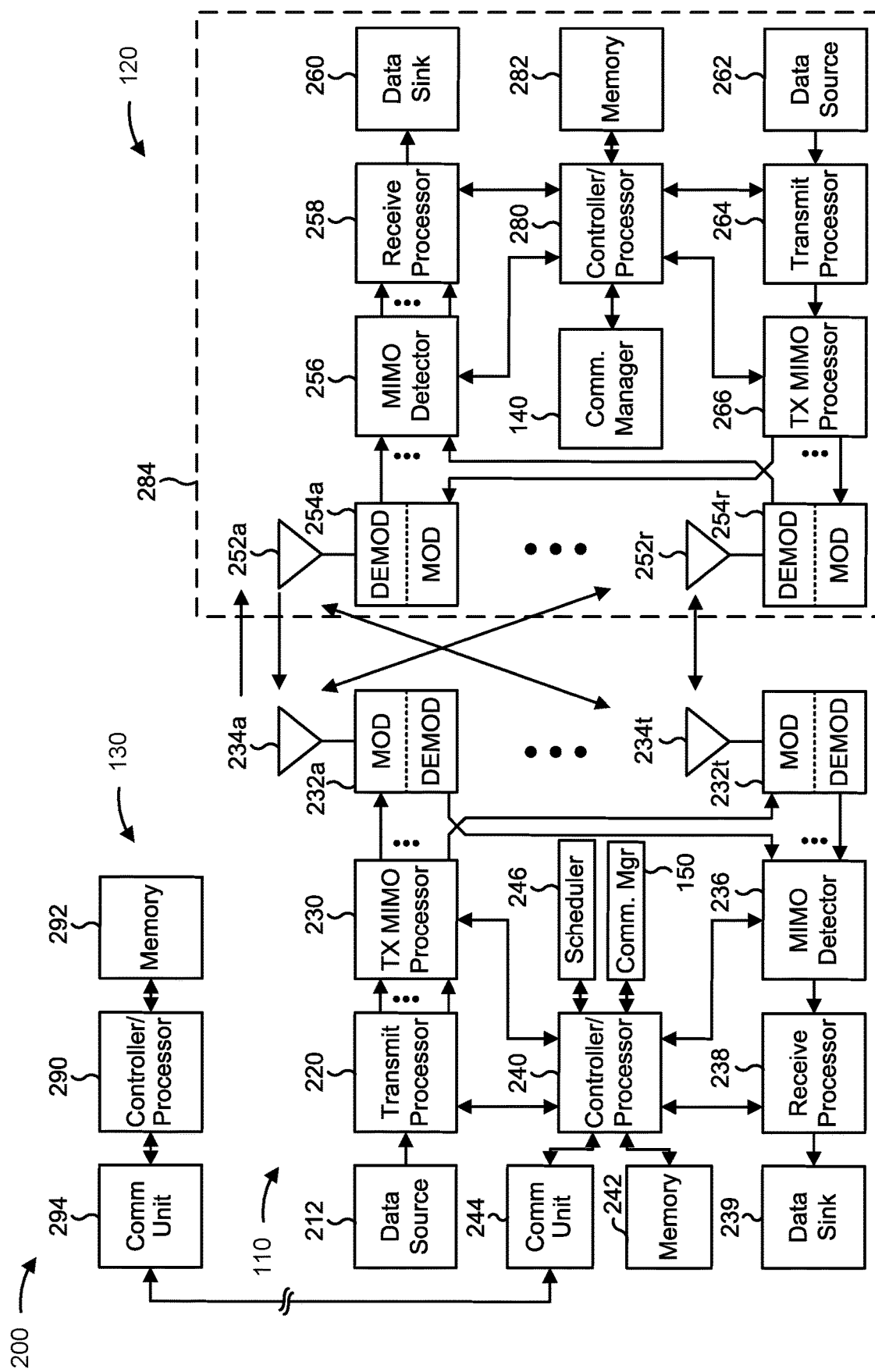
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with dynamic adaptation of broadcast transmissions for network energy savings, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the network node includes means for transmitting a dynamic indication of an updated configuration for an always-on periodic communication associated with the network node; and/or means for communicating the always-on periodic communication according to the updated configuration. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving a dynamic indication of an updated configuration for an always-on periodic communication associated with a network node; and/or means for communicating the always-on periodic communication according to the updated configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, the term "base station" (e.g., the base station 110) may refer to an aggregated base station, a disaggregated base station, and/or one or more components of a disaggregated base station. For example, in some aspects, "base station" may refer to a control unit, a distributed unit, a plurality of control units, a plurality of distributed units, and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

As indicated above, FIG. 2 is provided as an example. Other examples may differ from what is described with regard to FIG. 2.

Figure 3:
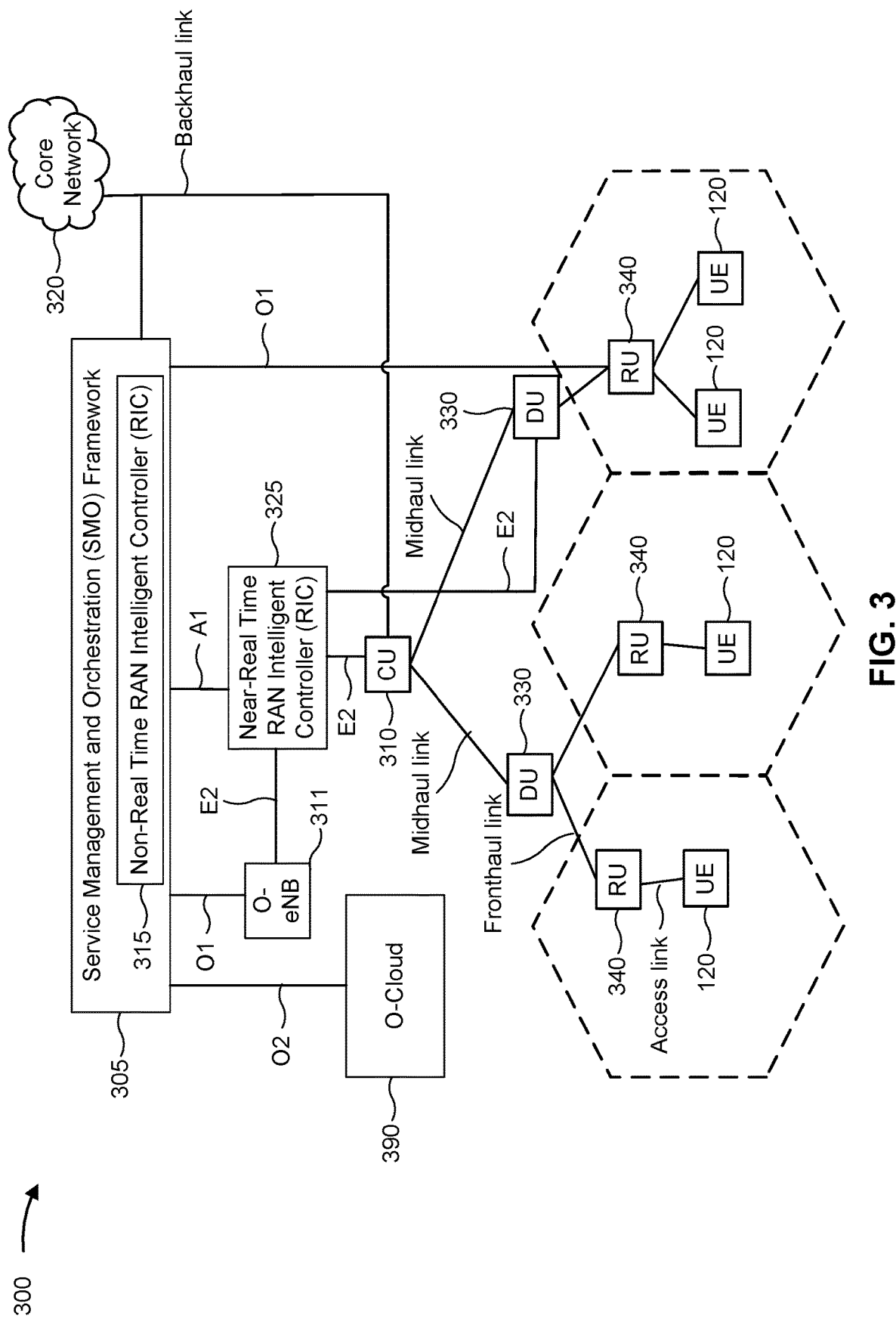
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
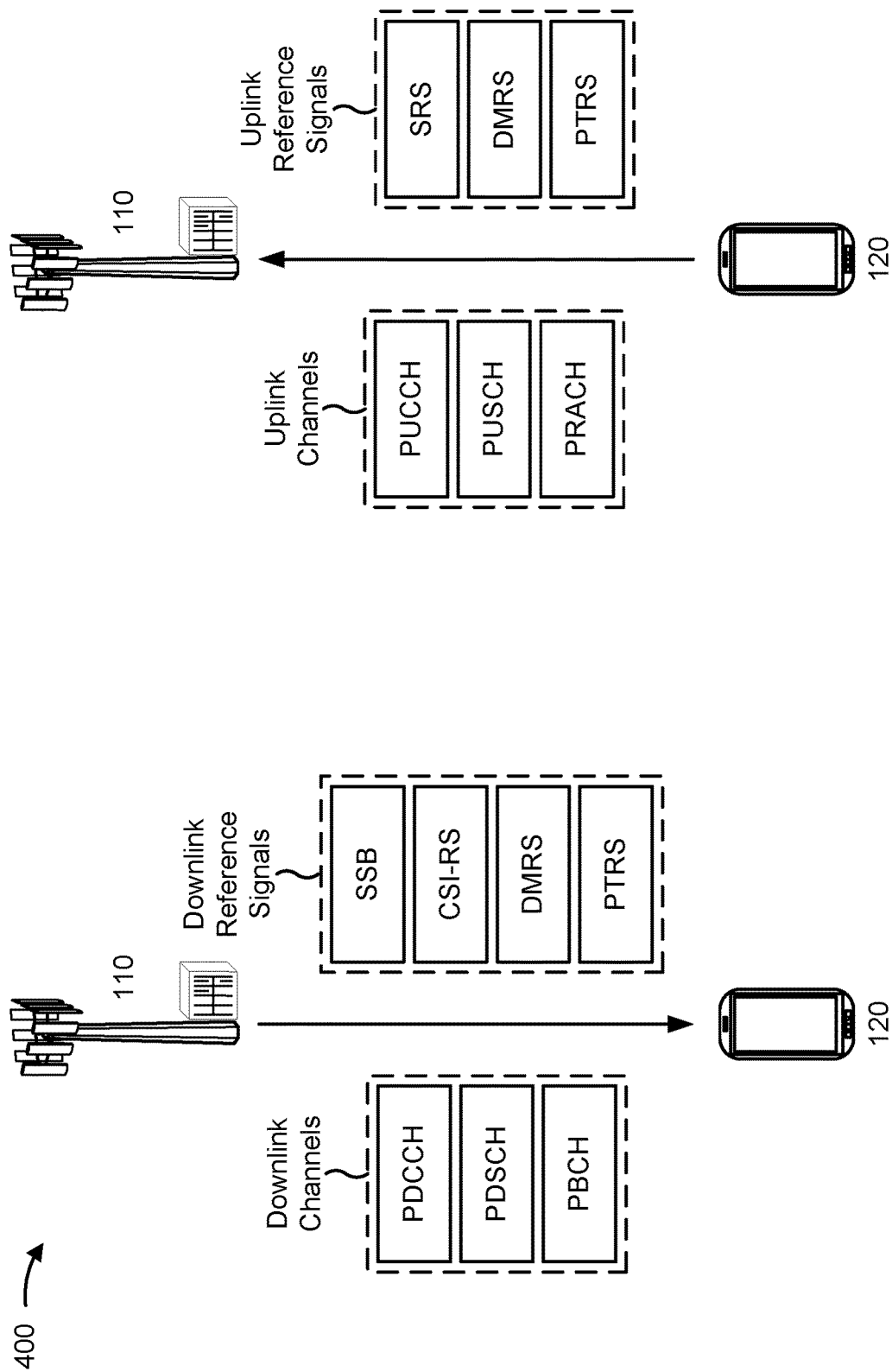
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a base station 110 or a similar network entity (e.g., a CU 310, a DU 330, an RU 340, or the like) to a UE 120, and uplink channels and uplink reference signals may carry information from a UE 120 to a base station 110 or a similar network entity.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some cases, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some cases, the base station 110 or a similar network entity may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 or a similar network entity may configure a set of CSI-RSs for the UE 120, and the UE 120 may measure the configured set of CSI-RSs. Based at least in part on the measurements, the UE 120 may perform channel estimation and may report channel estimation parameters to the base station 110 or a similar network entity (e.g., in a CSI report), such as a channel quality indicator (CQI), a precoding matrix indicator (PMI), a CSI-RS resource indicator (CRI), a layer indicator (LI), a rank indicator (RI), or a RSRP, among other examples. The base station 110 or a similar network entity may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 or a similar network entity to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 or a similar network entity may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 or a similar network entity may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 or a similar network entity may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

A network node in an energy saving mode may change the configuration (e.g., the periodicity) of one or more always-on periodic communications. In some cases, the network node may change the configuration by implementation. For example, the network node may change the periodicity at which the cell transmits an SSB or at which the network node monitors for a random access channel (RACH) transmission. In some cases, to change the configuration of an always-on periodic communication, the network node may update a service information block 1 (SIB1) and may transmit a service information (SI) update indication to all of the UEs associated with the network node. The UEs may receive the SI update indication and may obtain updated remaining minimum system information (RMSI) to determine the change in the configuration of the always-on periodic communication.

However, the amount of time required to change the configuration of the always-on periodic communication by implementation may prohibit the configuration from being dynamically changed. Further, because the network node may not be aware of the location of each UE associated with the cell, the cell may broadcast the SI update indication in multiple directions and/or utilizing multiple transmission beams, which may cause the cell to consume an amount of power that is greater than the amount of power conserved by changing the configuration of the always-on periodic communication. Additionally, changing the configuration of the always-on periodic communication by implementation may cause the UE to consume additional power associated with receiving the SI update indication and obtaining the updated RMSI.

Some techniques and apparatuses described herein enable a network node (e.g., a base station 110) to dynamically change a configuration (e.g., periodicity) of an always-on periodic communication based at least in part on an explicit indication of the change in the configuration (e.g., rather than indirectly indicating the change by transmitting an SI update indication and requiring a UE to obtain updated RMSI to determine the change).

For example, in some aspects, the network node may transmit an indication of an index value. The index value may be mapped to a value of a parameter of the always-on periodic communication. The mapping of index values to values of parameters of an always-on periodic communication may be preconfigured, provided via RRC signaling, and/or indicated in a SIB 1. A UE associated with the network node may receive the indication and may utilize the mapping of the index value to the value of the parameter to determine the change in the configuration of the always-on periodic communication. As a result, a network node is able to dynamically and explicitly change a configuration of an always-on periodic communication.

Figure 5:
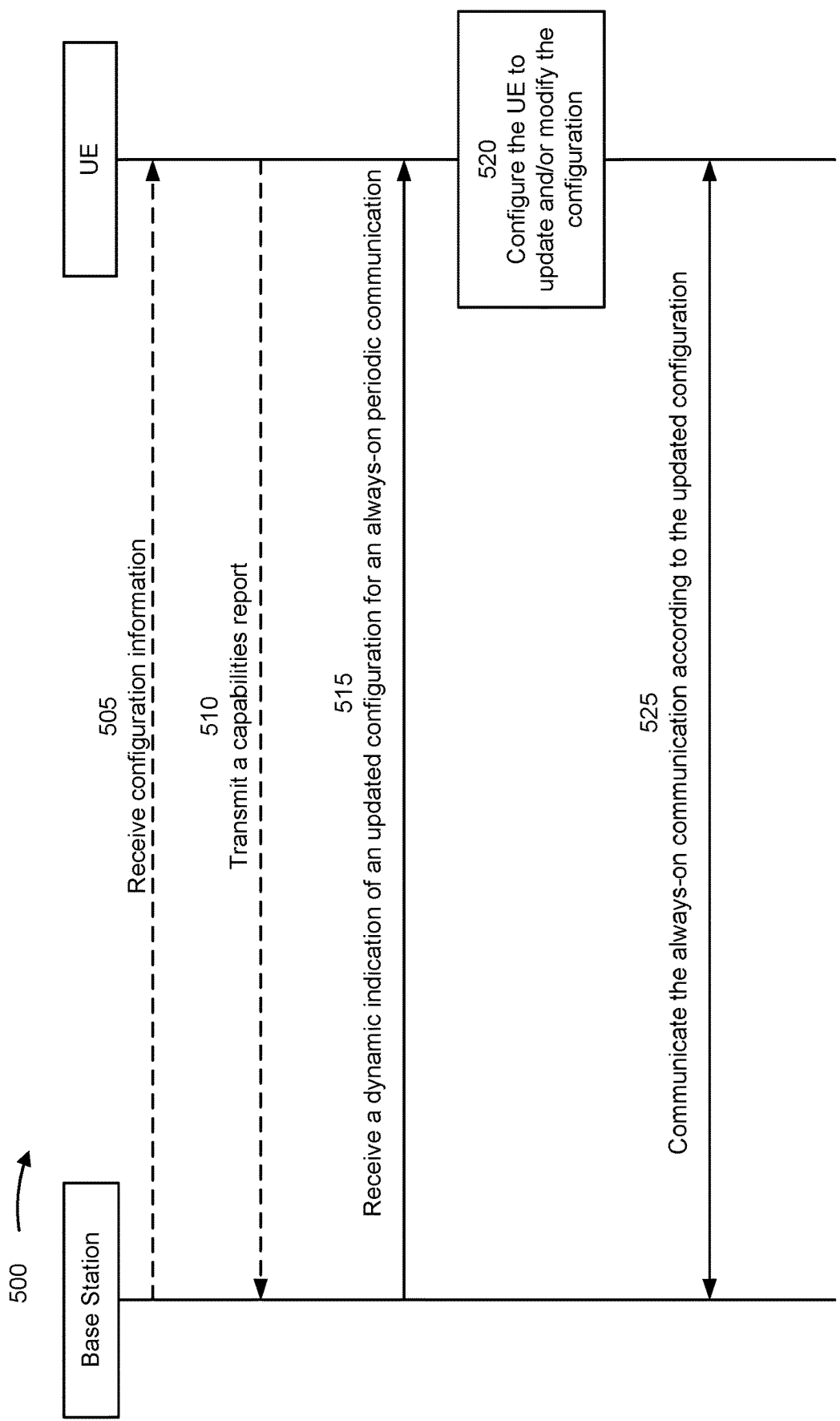
FIG. 5 is a diagram illustrating an example associated with dynamic adaptation of broadcast transmissions for network energy savings, in accordance with the present disclosure.

FIG. 5 is a diagram of an example 500 associated with dynamic adaptation of broadcast transmissions for network energy savings, in accordance with the present disclosure. As shown in FIG. 5, a network node (e.g., a base station 110 or similar network entity) may communicate with a UE (e.g., a UE 120). In some aspects, the network node and the UE may be part of a wireless network (e.g., wireless network 100). The UE and the network node may have established a wireless connection prior to operations shown in FIG. 5.

In some aspects, as shown by reference number 505, the network node may transmit, and the UE may receive, configuration information. In some aspects, the UE may receive the configuration information via one or more of RRC signaling, one or more medium access control (MAC) control elements (CEs), and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may include one or more parameters associated with an always-on periodic communication (e.g., an SSB communication, a tracking reference signal (TRS) communication, a RACH communication, and/or a remaining minimum system information (RMSI) physical downlink control channel (PDCCH) communication, among other examples). In some aspects, the always-on periodic communication may include a transmission of an SSB (e.g., by the network node) and the configuration information may indicate one or more parameters associated with an SSB configuration. For example, the configuration information may indicate a periodicity at which the SSB is transmitted, whether a keep-alive signal is transmitted, whether a physical broadcast channel is transmitted, and/or whether SSB repetition is configured, among other examples.

In some aspects, the always-on periodic communication may include a RACH communication and the configuration information may indicate one or more parameters associated with a RACH configuration. For example, the configuration information may indicate RACH occasion (RO) resources, a power parameter, a preamble format, and/or an SSB-to-RO mapping, among other examples.

In some aspects, the always-on periodic communication may include an RMSI communication and the configuration information may indicate one or more parameters associated with an RMSI configuration. For example, the configuration information may indicate an RMSI PDCCH (search space zero) periodicity, among other examples.

The UE may configure itself based at least in part on the configuration information. In some aspects, the UE may communicate the always-on periodic communication with the network node based at least in part on the configuration information.

In some aspects, the configuration information may indicate a mapping of index values to different configurations (e.g., sets of parameters) and/or different configuration parameters for the always-on periodic communication. For example, the configuration information may indicate that a first index value is mapped to a first set of parameters for the always-on periodic communication and that a second index value is mapped to a second set of parameters for the always-on periodic communication. The second set of parameters may include one or more parameters that are different from one or more corresponding parameters included in the first set of parameters. Alternatively, or additionally, a SIB1 may indicate the mapping of the index values to different configurations and/or different configuration parameters.

In some aspects, as shown by reference number 510, the UE may transmit, and the network node may receive, a capabilities report. In some aspects, the capabilities report may indicate UE support for dynamic adaptation of broadcast transmissions. For example, the capabilities report may indicate whether the UE is configured to dynamically update configuration parameters for an always-on periodic communication.

As shown by reference number 515, the UE may receive, and the network node may transmit, a dynamic indication of an updated configuration for an always-on periodic communication associated with the network node. For example, the network node may enter a power saving mode and may modify a periodicity of an always-on periodic communication based at least in part on entering the power saving mode. In some aspects, the dynamic indication of the updated configuration may be transmitted via DCI, a media access control-control element (MAC-CE), a broadcast transmission, a groupcast transmission, group-common DCI, an SI update indication, a paging PDCCH associated with transmitting the SI update indication, or a payload of a PDSCH that is scheduled by the paging PDCCH.

In some aspects, the dynamic indication of the updated configuration may be based at least in part on particular parameter being utilized to scramble a communication that includes the dynamic indication of the updated configuration. For example, the dynamic indication of the updated configuration may be included in a PDCCH associated with sending an SI update indication and the PDCCH may be scrambled based at least in part on a radio network temporary identifier (RNTI) (e.g., a dedicated paging RNTI).

The network node may transmit the dynamic indication of the updated configuration to one or more UEs associated with the network node and/or one or more other network nodes associated with the network node. In some aspects, the network node may be associated with a plurality of UEs, and the network node may transmit the dynamic indication of the updated configuration to each UE of the plurality of UEs associated with the network node.

In some aspects, the network node may transmit the dynamic indication of the updated configuration to a subset of the plurality of UEs. For example, the network node may transmit the dynamic indication of the updated configuration to a subset of UEs, of the plurality of UEs, that are connected to the network node, associated with a particular transmission beam, and/or include a capability associated with receiving the dynamic indication of the updated configuration, among other examples.

In some aspects, the network node may transmit the dynamic indication of the updated configuration based at least in part on receiving a request. For example, the UE may transmit a request to modify a configuration for an always-on periodic communication. The network node may receive the request and may transmit the dynamic indication of the updated configuration to modify the configuration for the always-on periodic communication according to the request.

In some aspects, the dynamic indication of the updated configuration may indicate a value of a parameter for the always-on periodic communication. For example, the dynamic indication of the updated configuration may indicate a periodicity associated with an SSB communication, a periodicity associated with a TRS, a periodicity associated with a RACH communication, a quantity of transmitted SSBs, a location of the transmitted SSBs, a location associated with a transmitted TRS, whether a keep-alive signal is transmitted, whether a physical broadcast channel is transmitted, whether SSB repetition is configured, a preamble format associated with the RACH communication, a power parameter associated with the SSB, a power parameter associated with the TRS, a power parameter associated with the RACH communication, and/or a periodicity associated with a RMSI PDCCH communication, among other examples.

In some aspects, the dynamic indication may include an indication of an index value, of a plurality of index values. In some aspects, the plurality of index values may be mapped to respective configurations (e.g., sets of parameters) associated with the always-on periodic communication. In some aspects, the plurality of index values may be mapped to respective values of a configuration parameter (e.g., a periodicity) associated with the always-on periodic communication.

In some aspects, the plurality of index values, the configurations, and/or the values of the configuration parameter are associated with one or more frequency ranges. For example, a first index value, a first configuration, and/or a first value of the configuration parameter may be associated with a first frequency range, and a second index value, a second configuration, and/or a second value of the configuration parameter may be associated with a second frequency range that is different from the first frequency range.

In some aspects, the dynamic indication of the updated configuration may indicate a scaling factor associated with a reference value of a configuration parameter. In some aspects, the reference value of the configuration may be preconfigured. In some aspects, the reference value of the configuration parameter may be indicated via RRC signaling, a MAC-CE, or DCI. For example, the configuration information may indicate a reference value of a configuration parameter associated with the always-on periodic communication. The dynamic indication of the updated configuration may indicate a scaling factor (e.g., one-half of the reference value, two times the reference value, or three times the reference value, among other examples) used to determine an updated value for the configuration parameter.

As shown by reference number 520, the UE may configure itself, based at least in part on receiving the dynamic indication of the updated configuration, to update and/or modify the configuration and/or the value of the parameter of the always-on periodic communication. As shown by reference number 525, the UE and the network node may communicate the always-on periodic communication according to the updated configuration.

As indicated above, FIG. 5 is provided as an example. Other examples may differ from what is described with regard to FIG. 5.

Figure 6:
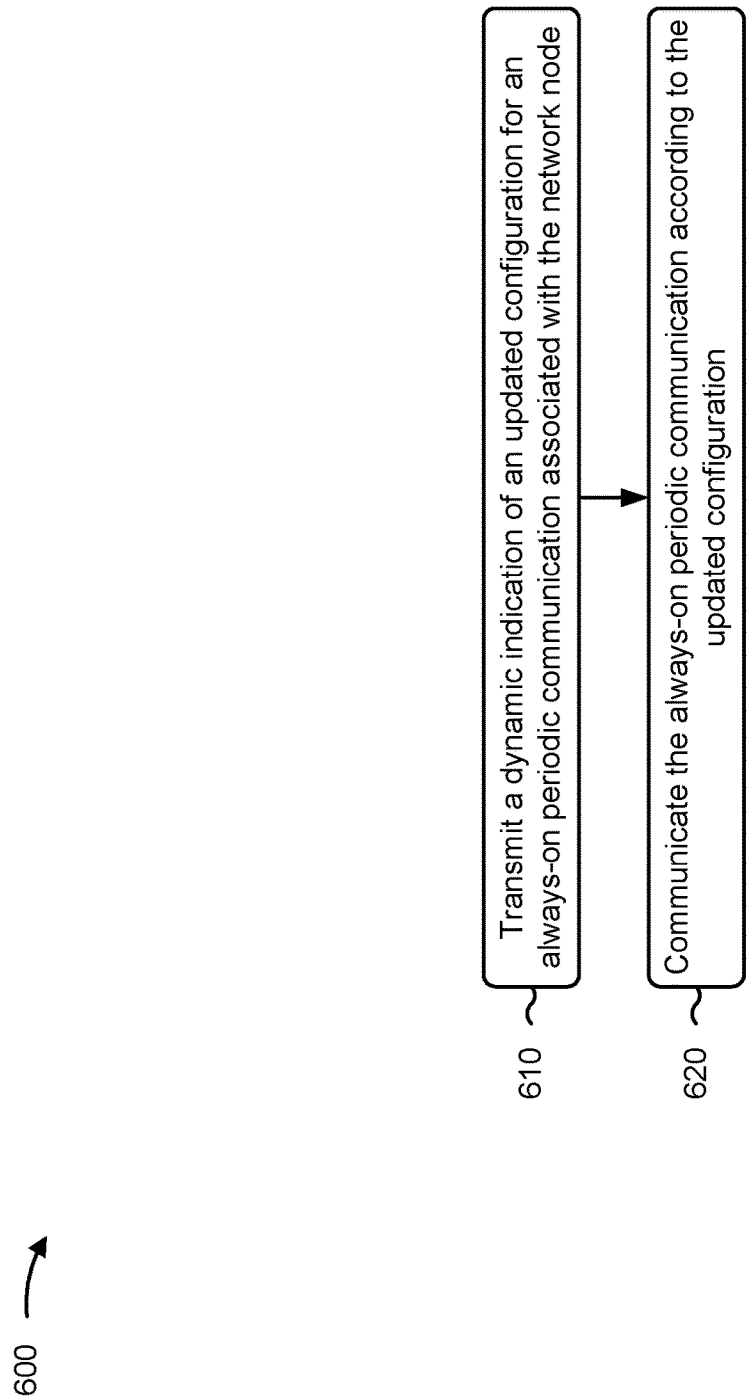
FIGS. 6 and 7 are diagrams illustrating example processes associated with dynamic adaptation of broadcast transmissions for network energy savings, in accordance with the present disclosure.

FIG. 6 is a diagram illustrating an example process 600 performed, for example, by a network node, in accordance with the present disclosure. Example process 600 is an example where the network node (e.g., base station 110) performs operations associated with dynamic adaptation of broadcast transmissions for network energy savings.

As shown in FIG. 6, in some aspects, process 600 may include transmitting a dynamic indication of an updated configuration for an always-on periodic communication associated with the network node (block 610). For example, the network node (e.g., using communication manager 808 and/or transmission component 804, depicted in FIG. 8) may transmit a dynamic indication of an updated configuration for an always-on periodic communication associated with the network node, as described above.

As further shown in FIG. 6, in some aspects, process 600 may include communicating the always-on periodic communication according to the updated configuration (block 620). For example, the network node (e.g., using communication manager 808, reception component 802, and/or transmission component 804, depicted in FIG. 8) may communicate the always-on periodic communication according to the updated configuration, as described above.

Process 600 may include additional aspects, such as any single aspect or any combination of aspects described below and/or in connection with one or more other processes described elsewhere herein.

In a first aspect, the dynamic indication of the updated configuration includes an indication of an index value, of a plurality of index values, wherein the plurality of index values are mapped to respective values of a configuration parameter associated with the always-on periodic communication.

In a second aspect, alone or in combination with the first aspect, a SIB1 associated with the network node indicates a mapping of the plurality of index values to the respective values of the configuration parameter.

In a third aspect, alone or in combination with one or more of the first and second aspects, the respective values of the configuration parameter associated with the always-on periodic communication include a first range of values associated with a first frequency range and a second range of values associated with a second frequency range that is different from the first frequency range.

In a fourth aspect, alone or in combination with one or more of the first through third aspects, transmitting the dynamic indication of the updated configuration for the always-on periodic communication comprises transmitting an indication of a plurality of configurations for the always-on periodic communication, wherein a configuration, of the plurality of configurations, is mapped to an index value, and wherein the dynamic indication of the updated configuration includes an indication of the index value.

In a fifth aspect, alone or in combination with one or more of the first through fourth aspects, the dynamic indication of the plurality of configurations for the always-on periodic communication is transmitted via an RRC message.

In a sixth aspect, alone or in combination with one or more of the first through fifth aspects, the dynamic indication of the updated configuration for the always-on periodic communication includes an indication of a scaling factor associated with a value of a reference configuration parameter.

In a seventh aspect, alone or in combination with one or more of the first through sixth aspects, process 600 includes transmitting an indication of the value of the reference configuration parameter.

In an eighth aspect, alone or in combination with one or more of the first through seventh aspects, the value of the reference configuration parameter is a pre-configured value.

In a ninth aspect, alone or in combination with one or more of the first through eighth aspects, the dynamic indication of the updated configuration for the always-on periodic communication is transmitted via DCI, a MAC-CE, a broadcast transmission, a groupcast transmission, group-common DCI, an SI update indication, a paging PDCCH associated with transmitting the SI update indication, or a payload of a PDSCH that is scheduled by the paging PDCCH.

In a tenth aspect, alone or in combination with one or more of the first through ninth aspects, the network node is associated with a plurality of UEs, and transmitting the dynamic indication of the updated configuration for the always-on periodic communication comprises transmitting the indication of the updated configuration for the always-on periodic communication to a subset of UEs of the plurality of UEs.

In an eleventh aspect, alone or in combination with one or more of the first through tenth aspects, the subset of UEs includes one or more UEs that are one or more of: connected to the network node, associated with a particular transmission beam, or include a capability associated with receiving the dynamic indication of the updated configuration for the always-on periodic communication.

In a twelfth aspect, alone or in combination with one or more of the first through eleventh aspects, the dynamic indication of the updated configuration for the always-on periodic communication is transmitted via a paging PDCCH associated with sending an SI update indication, and the paging PDCCH may be scrambled based at least in part on an RNTI.

In a thirteenth aspect, alone or in combination with one or more of the first through twelfth aspects, the RNTI includes a dedicated paging RNTI.

In a fourteenth aspect, alone or in combination with one or more of the first through thirteenth aspects, the always-on periodic communication comprises an SSB communication, a TRS communication, a RACH communication, or an RMSI PDCCH communication.

In a fifteenth aspect, alone or in combination with one or more of the first through fourteenth aspects, the updated configuration for the always-on periodic communication indicates one or more of a periodicity associated with an SSB communication, a periodicity associated with a TRS, a periodicity associated with a RACH communication, a quantity of transmitted SSBs, a location of the transmitted SSBs, a location associated with a transmitted TRS, whether a keep-alive signal is transmitted, whether a physical broadcast channel is transmitted, whether SSB repetition is configured, a preamble format associated with the RACH communication, a power parameter associated with the SSB, a power parameter associated with the TRS, a power parameter associated with the RACH communication, or a periodicity associated with an RMSI PDCCH communication.

In a sixteenth aspect, alone or in combination with one or more of the first through fifteenth aspects, process 600 includes receiving a request to modify a configuration for the always-on periodic communication, wherein the dynamic indication of the updated configuration for the always-on periodic communication is transmitted based at least in part on the request.

In a seventeenth aspect, alone or in combination with one or more of the first through sixteenth aspects, process 600 includes receiving, from another network node, an indication that the other network node has a capability associated with receiving the indication of the updated configuration for the always-on periodic communication, wherein the dynamic indication of the updated configuration for the always-on periodic communication is transmitted based at least in part on receiving the indication.

In an eighteenth aspect, alone or in combination with one or more of the first through seventeenth aspects, the UE receives the dynamic indication of the updated configuration based at least in part on one or more of: the UE being connected to the network node, the UE being associated with a particular transmission beam, or the UE including a capability associated with receiving the dynamic indication of the updated configuration for the always-on periodic communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
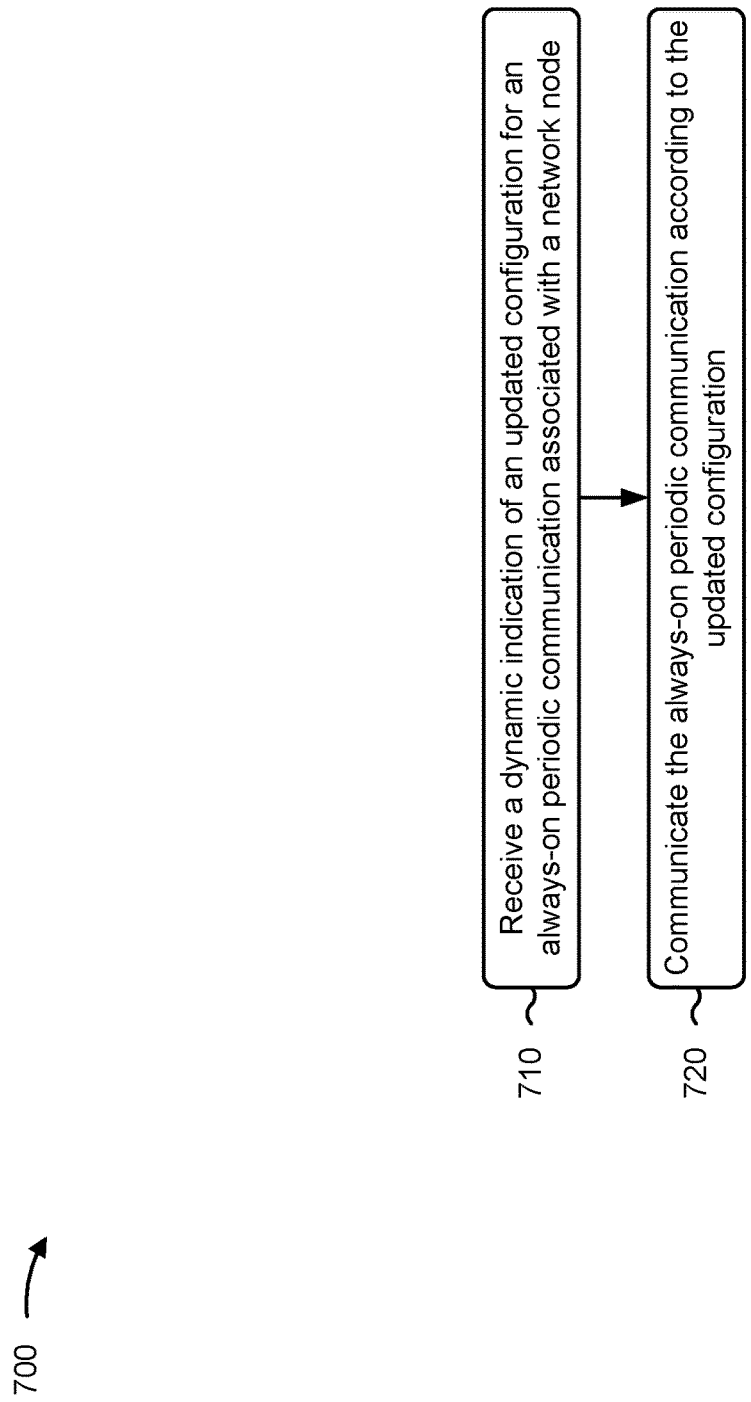

FIG. 7 is a diagram illustrating an example process 700 performed, for example, by a UE, in accordance with the present disclosure. Example process 700 is an example where the UE (e.g., UE 120) performs operations associated with dynamic adaptation of broadcast transmissions for network.

As shown in FIG. 7, in some aspects, process 700 may include receiving a dynamic indication of an updated configuration for an always-on periodic communication associated with a network node (block 710). For example, the UE (e.g., using communication manager 140 and/or reception component 902, depicted in FIG. 9) may receive a dynamic indication of an updated configuration for an always-on periodic communication associated with a network node, as described above.

As further shown in FIG. 7, in some aspects, process 700 may include communicating the always-on periodic communication according to the updated configuration (block 720). For example, the UE (e.g., using communication manager 140, reception component 902, and/or transmission component 904, depicted in FIG. 9) may communicate the always-on periodic communication according to the updated configuration, as described above.

Process 700 may include additional aspects, such as any single aspect or any combination of aspects described below and/or in connection with one or more other processes described elsewhere herein.

In a first aspect, the dynamic indication of the updated configuration includes an indication of an index value, of a plurality of index values, wherein the plurality of index values are mapped to respective values of a configuration parameter associated with the always-on periodic communication.

In a second aspect, alone or in combination with the first aspect, an SIB1 associated with the network node indicates a mapping of the plurality of index values to the respective values of the configuration parameter.

In a third aspect, alone or in combination with one or more of the first and second aspects, the respective values of the configuration parameter associated with the always-on periodic communication include a first range of values associated with a first frequency range and a second range of values associated with a second frequency range that is different from the first frequency range.

In a fourth aspect, alone or in combination with one or more of the first through third aspects, receiving the dynamic indication of the updated configuration for the always-on periodic communication comprises receiving an indication of a plurality of configurations for the always-on periodic communication, wherein a configuration, of the plurality of configurations, is mapped to an index value, and wherein the dynamic indication of the updated configuration includes an indication of the index value.

In a fifth aspect, alone or in combination with one or more of the first through fourth aspects, the dynamic indication of the plurality of configurations for the always-on periodic communication is received via an RRC message.

In a sixth aspect, alone or in combination with one or more of the first through fifth aspects, the dynamic indication of the updated configuration for the always-on periodic communication includes an indication of a scaling factor associated with a value of a reference configuration parameter.

In a seventh aspect, alone or in combination with one or more of the first through sixth aspects, process 700 includes receiving an indication of the value of the reference configuration parameter.

In an eighth aspect, alone or in combination with one or more of the first through seventh aspects, the value of the reference configuration parameter is a pre-configured value.

In a ninth aspect, alone or in combination with one or more of the first through eighth aspects, the dynamic indication of the updated configuration for the always-on periodic communication is received via DCI, a MAC-CE, a broadcast transmission, a groupcast transmission, group-common DCI, an SI update indication, a paging PDCCH associated with transmitting the SI update indication, or a payload of a PDSCH that is scheduled by the paging PDCCH.

In a tenth aspect, alone or in combination with one or more of the first through ninth aspects, the dynamic indication of the updated configuration for the always-on periodic communication is received via a paging PDCCH associated with sending an SI update indication, and the paging PDCCH is scrambled based at least in part on an RNTI.

In an eleventh aspect, alone or in combination with one or more of the first through tenth aspects, the RNTI includes a dedicated paging RNTI.

In a twelfth aspect, alone or in combination with one or more of the first through eleventh aspects, the always-on periodic communication comprises an SSB communication, a TRS communication, a RACH communication, or an RMSI PDCCH communication.

In a thirteenth aspect, alone or in combination with one or more of the first through twelfth aspects, the updated configuration for the always-on periodic communication indicates one or more of a periodicity associated with an SSB communication, a periodicity associated with a TRS, a periodicity associated with a RACH communication, a quantity of transmitted SSBs, a location of the transmitted SSBs, a location associated with a transmitted TRS, whether a keep-alive signal is transmitted, whether a physical broadcast channel is transmitted, whether SSB repetition is configured, a preamble format associated with the RACH communication, a power parameter associated with the SSB, a power parameter associated with the TRS, a power parameter associated with the RACH communication, or a periodicity associated with an RMSI PDCCH communication.

In a fourteenth aspect, alone or in combination with one or more of the first through thirteenth aspects, process 700 includes transmitting a request to modify a configuration for the always-on periodic communication, wherein the dynamic indication of the updated configuration for the always-on periodic communication is received based at least in part on the request.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
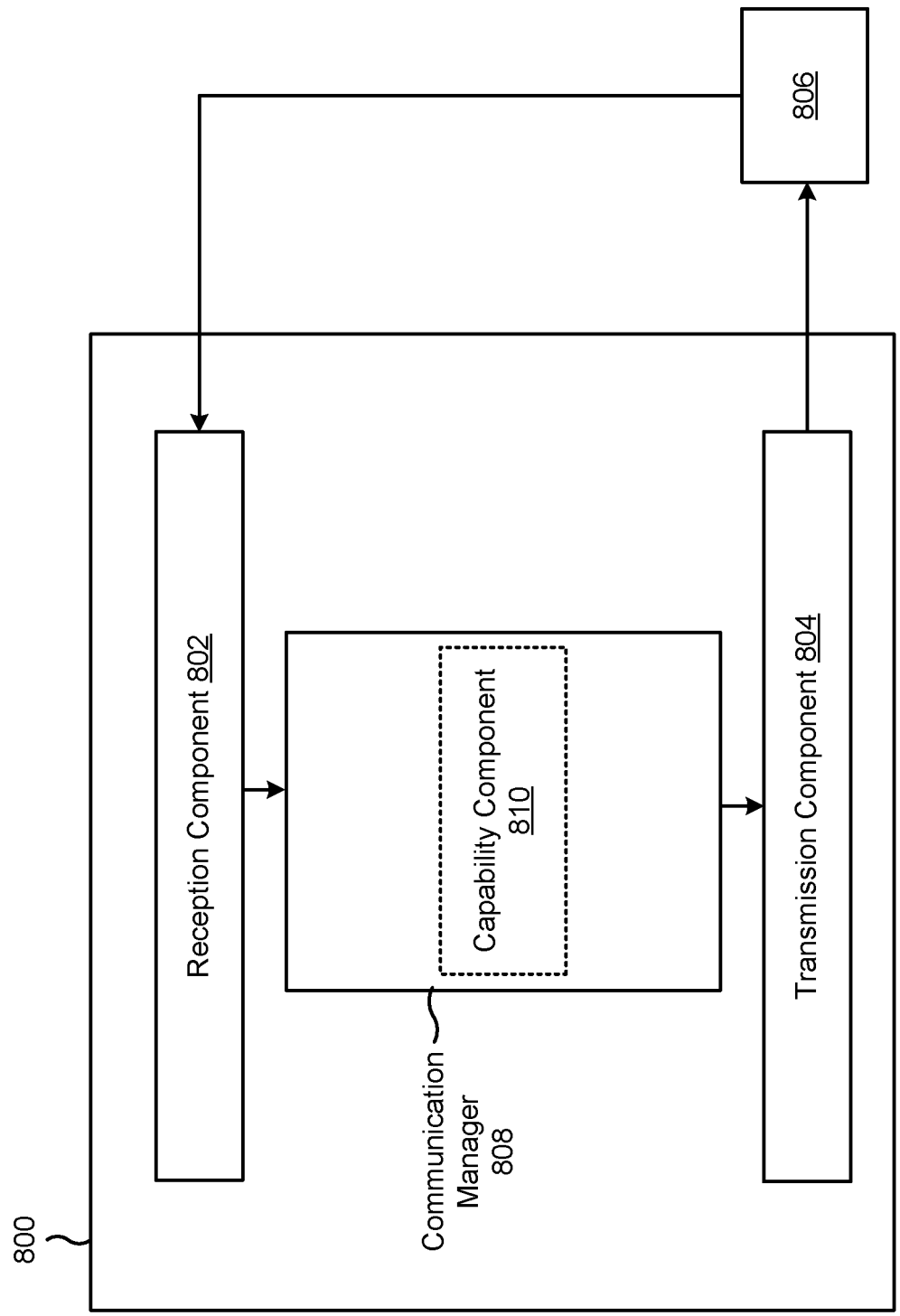
FIGS. 8 and 9 are diagrams of example apparatuses for wireless communication, in accordance with the present disclosure.

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808.

The communication manager 808 may control and/or otherwise manage one or more operations of the reception component 802 and/or the transmission component 804. In some aspects, the communication manager 808 may include one or more antennas, a modem, a controller/processor, a memory, or a combination thereof, of the base station described in connection with FIG. 2. The communication manager 808 may be, or be similar to, the communication manager 150 depicted in FIGS. 1 and 2. For example, in some aspects, the communication manager 808 may be configured to perform one or more of the functions described as being performed by the communication manager 150. In some aspects, the communication manager 808 may include the reception component 802 and/or the transmission component 804. The communication manager 808 may include a capability component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

The transmission component 804 may transmit a dynamic indication of an updated configuration for an always-on periodic communication associated with the network node. The reception component 802 and/or the transmission component 804 may communicate the always-on periodic communication according to the updated configuration.

The transmission component 804 may transmit an indication of the value of the reference configuration parameter.

The reception component 802 may receive a request to modify a configuration for the always-on periodic communication, wherein the dynamic indication of the updated configuration for the always-on periodic communication is transmitted based at least in part on the request.

The reception component 802 and/or the capability component 810 may receive, from another network node, an indication that the other network node has a capability associated with receiving the indication of the updated configuration for the always-on periodic communication. The dynamic indication of the updated configuration for the always-on periodic communication may be transmitted based at least in part on receiving the indication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
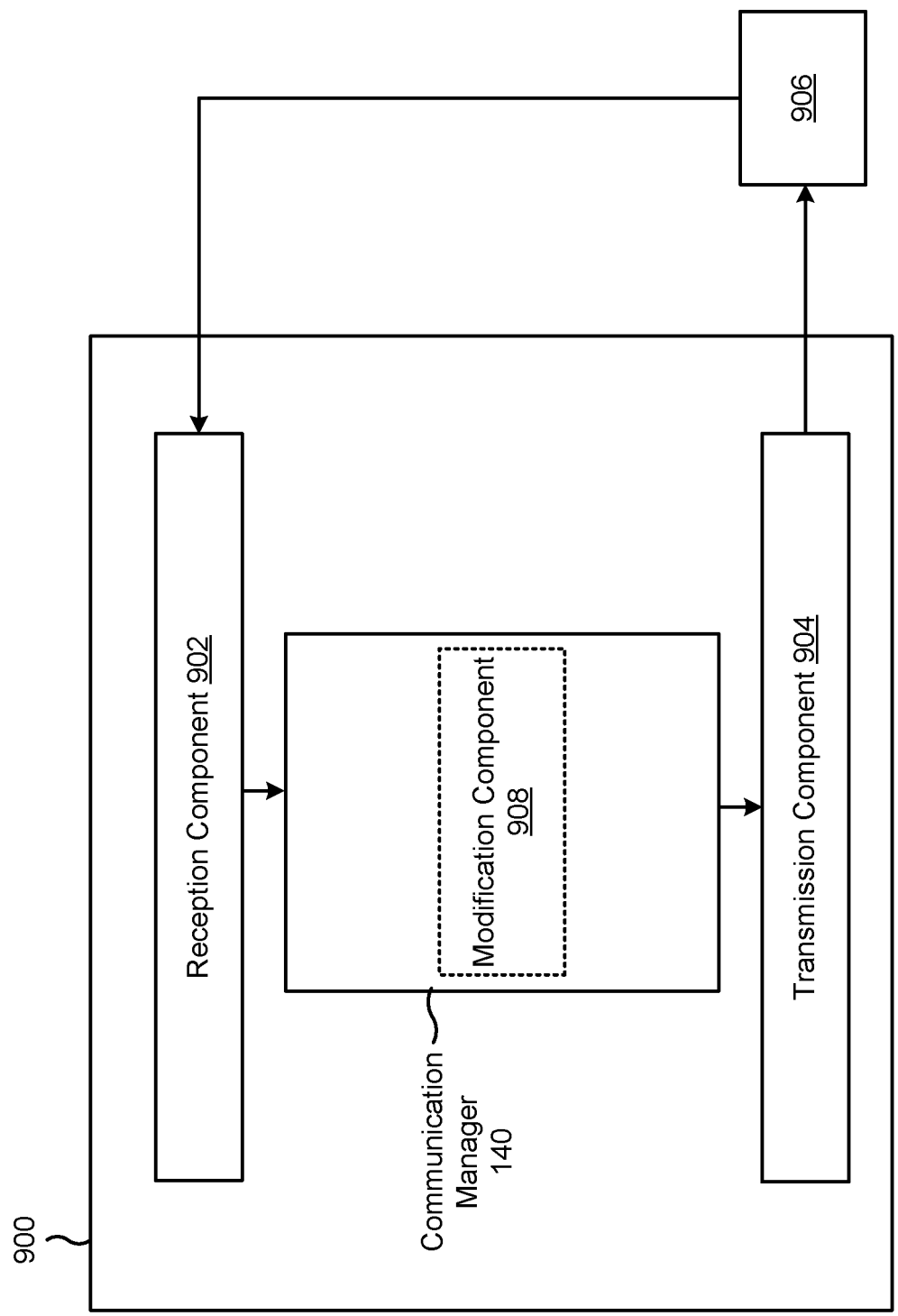

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a modification component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a dynamic indication of an updated configuration for an always-on periodic communication associated with a network node. The reception component 902 and/or the transmission component 904 may communicate the always-on periodic communication according to the updated configuration.

The reception component 902 may receive an indication of the value of the reference configuration parameter.

The modification component 908 may generate a request to modify a configuration for the always-on periodic communication. The transmission component 904 may transmit the request to modify a configuration for the always-on periodic communication. The dynamic indication of the updated configuration for the always-on periodic communication may be received based at least in part on the request.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a network node, comprising: transmitting a dynamic indication of an updated configuration for an always-on periodic communication associated with the network node; and communicating the always-on periodic communication according to the updated configuration.

Aspect 2: The method of Aspect 1, wherein the dynamic indication of the updated configuration includes an indication of an index value, of a plurality of index values, wherein the plurality of index values are mapped to respective values of a configuration parameter associated with the always-on periodic communication.

Aspect 3: The method of Aspect 2, wherein an SIB1 associated with the network node indicates a mapping of the plurality of index values to the respective values of the configuration parameter.

Aspect 4: The method of Aspect 2, wherein the respective values of the configuration parameter associated with the always-on periodic communication include a first range of values associated with a first frequency range and a second range of values associated with a second frequency range that is different from the first frequency range.

Aspect 5: The method of one or more of Aspects 1 through 4, wherein transmitting the dynamic indication of the updated configuration for the always-on periodic communication comprises: transmitting an indication of a plurality of configurations for the always-on periodic communication, wherein a configuration, of the plurality of configurations, is mapped to an index value, and wherein the dynamic indication of the updated configuration includes an indication of the index value.

Aspect 6: The method of Aspect 5, wherein the dynamic indication of the plurality of configurations for the always-on periodic communication is transmitted via an RRC message.

Aspect 7: The method of one or more of Aspects 1 through 6, wherein the dynamic indication of the updated configuration for the always-on periodic communication includes an indication of a scaling factor associated with a value of a reference configuration parameter.

Aspect 8: The method of Aspect 7, further comprising: transmitting an indication of the value of the reference configuration parameter.

Aspect 9: The method of Aspect 7, wherein the value of the reference configuration parameter is a pre-configured value.

Aspect 10: The method of one or more of Aspects 1 through 9, wherein the dynamic indication of the updated configuration for the always-on periodic communication is transmitted via DCI, a MAC-CE, a broadcast transmission, a groupcast transmission, group-common DCI, an SI update indication, a paging PDCCH associated with transmitting the SI update indication, or a payload of a PDSCH that is scheduled by the paging PDCCH.

Aspect 11: The method of one or more of Aspects 1 through 10, wherein the network node is associated with a plurality of UEs, and wherein transmitting the dynamic indication of the updated configuration for the always-on periodic communication comprises: transmitting the indication of the updated configuration for the always-on periodic communication to a subset of UEs of the plurality of UEs.

Aspect 12: The method of Aspect 11, wherein the subset of UEs include one or more UEs that are one or more of connected to the network node, associated with a particular transmission beam, or include a capability associated with receiving the dynamic indication of the updated configuration for the always-on periodic communication.

Aspect 13: The method of one or more of Aspects 1 through 12, wherein the dynamic indication of the updated configuration for the always-on periodic communication is transmitted via a paging PDCCH associated with sending an SI update indication, and wherein the paging PDCCH is scrambled based at least in part on an RNTI.

Aspect 14: The method of Aspect 13, wherein the RNTI includes a dedicated paging RNTI.

Aspect 15: The method of one or more of Aspects 1 through 14, wherein the always-on periodic communication comprises an SSB communication, a TRS communication, a RACH communication, or RMSI PDCCH communication.

Aspect 16: The method of one or more of Aspects 1 through 15, wherein the updated configuration for the always-on periodic communication indicates one or more of: a periodicity associated with an SSB communication, a periodicity associated with a TRS, a periodicity associated with a RACH communication, a quantity of transmitted SSBs, a location of the transmitted SSBs, a location associated with a transmitted TRS, whether a keep-alive signal is transmitted, whether a physical broadcast channel is transmitted, whether SSB repetition is configured, a preamble format associated with the RACH communication, a power parameter associated with the SSB, a power parameter associated with the TRS, a power parameter associated with the RACH communication, or a periodicity associated with an RMSI PDCCH communication.

Aspect 17: The method of one or more of Aspects 1 through 16, further comprising: receiving a request to modify a configuration for the always-on periodic communication, wherein the dynamic indication of the updated configuration for the always-on periodic communication is transmitted based at least in part on the request.

Aspect 18: The method of one or more of Aspects 1 through 17, further comprising: receiving, from another network node, an indication that the other network node has a capability associated with receiving the indication of the updated configuration for the always-on periodic communication, wherein the dynamic indication of the updated configuration for the always-on periodic communication is transmitted based at least in part on receiving the indication.

Aspect 19: A method of wireless communication performed by a UE, comprising: receiving a dynamic indication of an updated configuration for an always-on periodic communication associated with a network node; and communicating the always-on periodic communication according to the updated configuration.

Aspect 20: The method of Aspect 19, wherein the dynamic indication of the updated configuration includes an indication of an index value, of a plurality of index values, wherein the plurality of index values are mapped to respective values of a configuration parameter associated with the always-on periodic communication.

Aspect 21: The method of Aspect 20, wherein an SIB1 associated with the network node indicates a mapping of the plurality of index values to the respective values of the configuration parameter.

Aspect 22: The method of Aspect 20, wherein the respective values of the configuration parameter associated with the always-on periodic communication include a first range of values associated with a first frequency range and a second range of values associated with a second frequency range that is different from the first frequency range.

Aspect 23: The method of one or more of Aspects 19 through 22, wherein receiving the dynamic indication of the updated configuration for the always-on periodic communication comprises: receiving an indication of a plurality of configurations for the always-on periodic communication, wherein a configuration, of the plurality of configurations, is mapped to an index value, and wherein the dynamic indication of the updated configuration includes an indication of the index value.

Aspect 24: The method of Aspect 23, wherein the dynamic indication of the plurality of configurations for the always-on periodic communication is received via an RRC message.

Aspect 25: The method of one or more of Aspects 19 through 24, wherein the dynamic indication of the updated configuration for the always-on periodic communication includes an indication of a scaling factor associated with a value of a reference configuration parameter.

Aspect 26: The method of Aspect 25, further comprising: receiving an indication of the value of the reference configuration parameter.

Aspect 27: The method of Aspect 25, wherein the value of the reference configuration parameter is a pre-configured value.

Aspect 28: The method of one or more of Aspects 19 through 27, wherein the dynamic indication of the updated configuration for the always-on periodic communication is received via DCI, a MAC-CE, a broadcast transmission, a groupcast transmission, group-common DCI, an SI update indication, a paging PDCCH associated with transmitting the SI update indication, or a payload of a PDSCH that is scheduled by the paging PDCCH.

Aspect 29: The method of one or more of Aspects 19 through 28, wherein the UE receives the dynamic indication of the updated configuration based at least in part on one or more of the UE being connected to the network node, the UE being associated with a particular transmission beam, or the UE including a capability associated with receiving the dynamic indication of the updated configuration for the always-on periodic communication.

Aspect 30: The method of one or more of Aspects 19 through 29, wherein the dynamic indication of the updated configuration for the always-on periodic communication is received via a paging PDCCH associated with sending an SI update indication, and wherein the paging PDCCH is scrambled based at least in part on an RNTI.

Aspect 31: The method of Aspect 30, wherein the RNTI includes a dedicated paging RNTI.

Aspect 32: The method of one or more of Aspects 19 through 31, wherein the always-on periodic communication comprises an SSB communication, a TRS communication, a RACH communication, or an RMSI PDCCH communication.

Aspect 33: The method of one or more of Aspects 19 through 32, wherein the updated configuration for the always-on periodic communication indicates one or more of: a periodicity associated with an SSB communication, a periodicity associated with a TRS, a periodicity associated with a RACH communication, a quantity of transmitted SSBs, a location of the transmitted SSBs, a location associated with a transmitted TRS, whether a keep-alive signal is transmitted, whether a physical broadcast channel is transmitted, whether SSB repetition is configured, a preamble format associated with the RACH communication, a power parameter associated with the SSB, a power parameter associated with the TRS, a power parameter associated with the RACH communication, or a periodicity associated with an RMSI PDCCH communication.

Aspect 34: The method of one or more of Aspects 19 through 33, further comprising: transmitting a request to modify a configuration for the always-on periodic communication, wherein the dynamic indication of the updated configuration for the always-on periodic communication is received based at least in part on the request.

Aspect 35: An apparatus for wireless communication at a device, comprising a processor; memory coupled with the processor; and instructions stored in the memory and executable by the processor to cause the apparatus to perform the method of one or more of Aspects 1 through 18.

Aspect 36: A device for wireless communication, comprising a memory and one or more processors coupled to the memory, the one or more processors configured to perform the method of one or more of Aspects 1 through 18.

Aspect 37: An apparatus for wireless communication, comprising at least one means for performing the method of one or more of Aspects 1 through 18.

Aspect 38: A non-transitory computer-readable medium storing code for wireless communication, the code comprising instructions executable by a processor to perform the method of one or more of Aspects 1 through 18.

Aspect 39: A non-transitory computer-readable medium storing a set of instructions for wireless communication, the set of instructions comprising one or more instructions that, when executed by one or more processors of a device, cause the device to perform the method of one or more of Aspects 1 through 18.

Aspect 40: An apparatus for wireless communication at a device, comprising a processor; memory coupled with the processor; and instructions stored in the memory and executable by the processor to cause the apparatus to perform the method of one or more of Aspects 19 through 34.

Aspect 41: A device for wireless communication, comprising a memory and one or more processors coupled to the memory, the one or more processors configured to perform the method of one or more of Aspects 19 through 34.

Aspect 42: An apparatus for wireless communication, comprising at least one means for performing the method of one or more of Aspects 19 through 34.

Aspect 43: A non-transitory computer-readable medium storing code for wireless communication, the code comprising instructions executable by a processor to perform the method of one or more of Aspects 19 through 34.

Aspect 44: A non-transitory computer-readable medium storing a set of instructions for wireless communication, the set of instructions comprising one or more instructions that, when executed by one or more processors of a device, cause the device to perform the method of one or more of Aspects 19 through 34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
    a memory; and
    one or more processors, coupled to the memory, configured to:
        transmit configuration information that indicates a mapping of a plurality of index values to respective configurations of an always-on periodic communication associated with the network node;
        transmit a dynamic indication of an updated configuration for the always-on periodic communication, wherein the dynamic indication includes an indication of an index value of the plurality of index values; and
        communicate the always-on periodic communication according to the updated configuration.

2. The network node of claim 1, wherein the plurality of index values are mapped to respective values of a configuration parameter associated with the always-on periodic communication.

3. The network node of claim 2, wherein the configuration information comprises a system information block 1 (SIB1), associated with the network node, that indicates a mapping of the plurality of index values to the respective values of the configuration parameter.

4. The network node of claim 2, wherein the respective values of the configuration parameter associated with the always-on periodic communication include a first range of values associated with a first frequency range and a second range of values associated with a second frequency range that is different from the first frequency range.

5. The network node of claim 1, wherein the dynamic indication is transmitted via a radio resource control (RRC) message.

6. The network node of claim 1, wherein the dynamic indication of the updated configuration for the always-on periodic communication includes an indication of a scaling factor associated with a value of a reference configuration parameter.

7. The network node of claim 6, wherein the one or more processors are further configured to:
transmit an indication of the value of the reference configuration parameter.

8. The network node of claim 6, wherein the value of the reference configuration parameter is a pre-configured value.

9. The network node of claim 1, wherein the dynamic indication of the updated configuration for the always-on periodic communication is transmitted via downlink control information (DCI), a media access control control element (MAC-CE), a broadcast transmission, a groupcast transmission, group-common DCI, a system information (SI) update indication, a paging physical downlink control channel (PDCCH) associated with transmitting the SI update indication, or a payload of a physical downlink shared channel (PDSCH) that is scheduled by the paging PDCCH.

10. The network node of claim 1, wherein the network node is associated with a plurality of user equipment (UEs), and wherein the one or more processors, to transmit the dynamic indication of the updated configuration for the always-on periodic communication, are configured to:
transmit the dynamic indication of the updated configuration for the always-on periodic communication to a subset of UEs of the plurality of UEs.

11. The network node of claim 10, wherein the subset of UEs include one or more UEs that are one or more of connected to the network node, associated with a particular transmission beam, or include a capability associated with receiving the dynamic indication of the updated configuration for the always-on periodic communication.

12. The network node of claim 1, wherein the dynamic indication of the updated configuration for the always-on periodic communication is transmitted via a paging physical downlink control channel (PDCCH) associated with sending a system information (SI) update indication, and wherein the paging PDCCH is scrambled based at least in part on a radio network temporary identifier (RNTI).

13. The network node of claim 12, wherein the RNTI includes a dedicated paging RNTI.

14. The network node of claim 1, wherein the always-on periodic communication comprises a synchronization signal block (SSB) communication, a tracking reference signal (TRS) communication, a random access channel (RACH) communication, or a remaining minimum system information physical downlink control channel (PDCCH) communication.

15. The network node of claim 1, wherein the updated configuration for the always-on periodic communication indicates one or more of:
a periodicity associated with a synchronization signal block (SSB) communication,
a periodicity associated with a tracking reference signal (TRS),
a periodicity associated with a random access channel (RACH) communication,
a quantity of transmitted SSBs,
a location of the transmitted SSBs,
a location associated with a transmitted TRS,
whether a keep-alive signal is transmitted,
whether a physical broadcast channel is transmitted,
whether SSB repetition is configured,
a preamble format associated with the RACH communication,
a power parameter associated with the SSB,
a power parameter associated with the TRS,
a power parameter associated with the RACH communication, or
a periodicity associated with a remaining minimum system information physical downlink control channel (PDCCH) communication.

16. The network node of claim 1, wherein the one or more processors are further configured to:
receive a request to modify a configuration for the always-on periodic communication, wherein the dynamic indication of the updated configuration for the always-on periodic communication is transmitted based at least in part on the request.

17. The network node of claim 1, wherein the one or more processors are further configured to:
receive, from another network node, an indication that the other network node has a capability associated with receiving the dynamic indication of the updated configuration for the always-on periodic communication, wherein the dynamic indication of the updated configuration for the always-on periodic communication is transmitted based at least in part on receiving the indication.

18. A user equipment (UE) for wireless communication, comprising:
a memory; and
one or more processors, coupled to the memory, configured to:
receive configuration information that indicates a mapping of a plurality of index values to respective configurations of an always-on periodic communication associated with the UE;
receive a dynamic indication of an updated configuration for the always-on periodic communication, wherein the dynamic indication includes an indication of an index value of the plurality of index values; and
communicate the always-on periodic communication according to the updated configuration.

19. The UE of claim 18, wherein the plurality of index values are mapped to respective values of a configuration parameter associated with the always-on periodic communication.

20. The UE of claim 19, wherein the configuration information comprises a system information block 1 (SIB1) that indicates a mapping of the plurality of index values to the respective values of the configuration parameter.

21. The UE of claim 19, wherein the respective values of the configuration parameter associated with the always-on periodic communication include a first range of values associated with a first frequency range and a second range of values associated with a second frequency range that is different from the first frequency range.

22. The UE of claim 18, wherein the dynamic indication is received via a radio resource control (RRC) message.

23. The UE of claim 18, wherein the dynamic indication of the updated configuration for the always-on periodic communication includes an indication of a scaling factor associated with a value of a reference configuration parameter.

24. The UE of claim 23, wherein the one or more processors are further configured to:
receive an indication of the value of the reference configuration parameter.

25. The UE of claim 23, wherein the value of the reference configuration parameter is a pre-configured value.

26. The UE of claim 18, wherein the dynamic indication of the updated configuration for the always-on periodic communication is received via downlink control information (DCI), a media access control control element (MAC-CE), a broadcast transmission, a groupcast transmission, group-common DCI, a system information (SI) update indication, a paging physical downlink control channel (PDCCH) associated with transmitting the SI update indication, or a payload of a physical downlink shared channel (PDSCH) that is scheduled by the paging PDCCH.

27. The UE of claim 18, wherein the dynamic indication of the updated configuration for the always-on periodic communication is received via a paging physical downlink control channel (PDCCH) associated with sending a system information (SI) update indication, and wherein the paging PDCCH is scrambled based at least in part on a radio network temporary identifier (RNTI).

28. The UE of claim 18, wherein the always-on periodic communication comprises a synchronization signal block (SSB) communication, a tracking reference signal (TRS) communication, a random access channel (RACH) communication, or a remaining minimum system information physical downlink control channel (PDCCH) communication.

29. The UE of claim 18, wherein the updated configuration for the always-on periodic communication indicates one or more of:
- a periodicity associated with a synchronization signal block (SSB) communication,
- a periodicity associated with a tracking reference signal (TRS),
- a periodicity associated with a random access channel (RACH) communication,
- a quantity of transmitted SSBs,
- a location of the transmitted SSBs,
- a location associated with a transmitted TRS,
- whether a keep-alive signal is transmitted,
- whether a physical broadcast channel is transmitted,
- whether SSB repetition is configured,
- a preamble format associated with the RACH communication,
- a power parameter associated with the SSB,
- a power parameter associated with the TRS,
- a power parameter associated with the RACH communication, or
- a periodicity associated with a remaining minimum system information physical downlink control channel (PDCCH) communication.

30. The UE of claim 18, wherein the one or more processors are further configured to:
transmit a request to modify a configuration for the always-on periodic communication, wherein the dynamic indication of the updated configuration for the always-on periodic communication is received based at least in part on the request.

* * * * *